Figure 1:
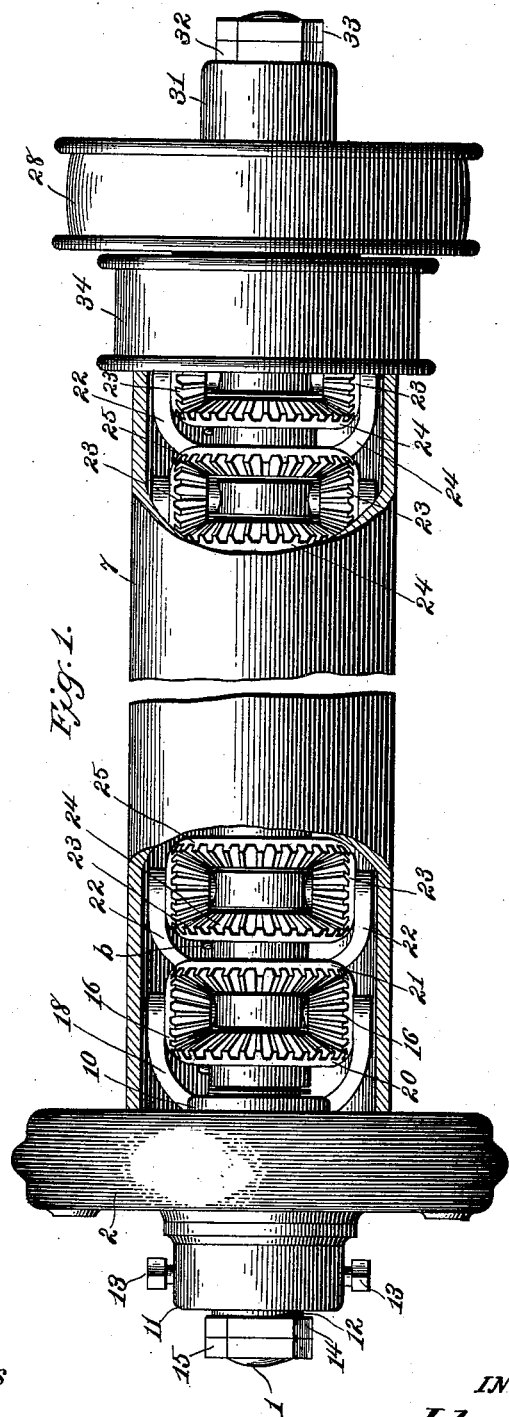

(No Model.)

2 Sheets—Sheet 1.

J. R. SCOFIELD.
SPEED GEARING.

No. 599,870.

Patented Mar. 1, 1898.

WITNESSES
E. C. Wurdeman
Victor J. Evans

INVENTOR
John R. Scofield
By John Wedderburn
Attorney (No Model.) 2 Sheets—Sheet 2.
J. R. SCOFIELD.
SPEED GEARING.
No. 599,870. Patented Mar. 1, 1898.
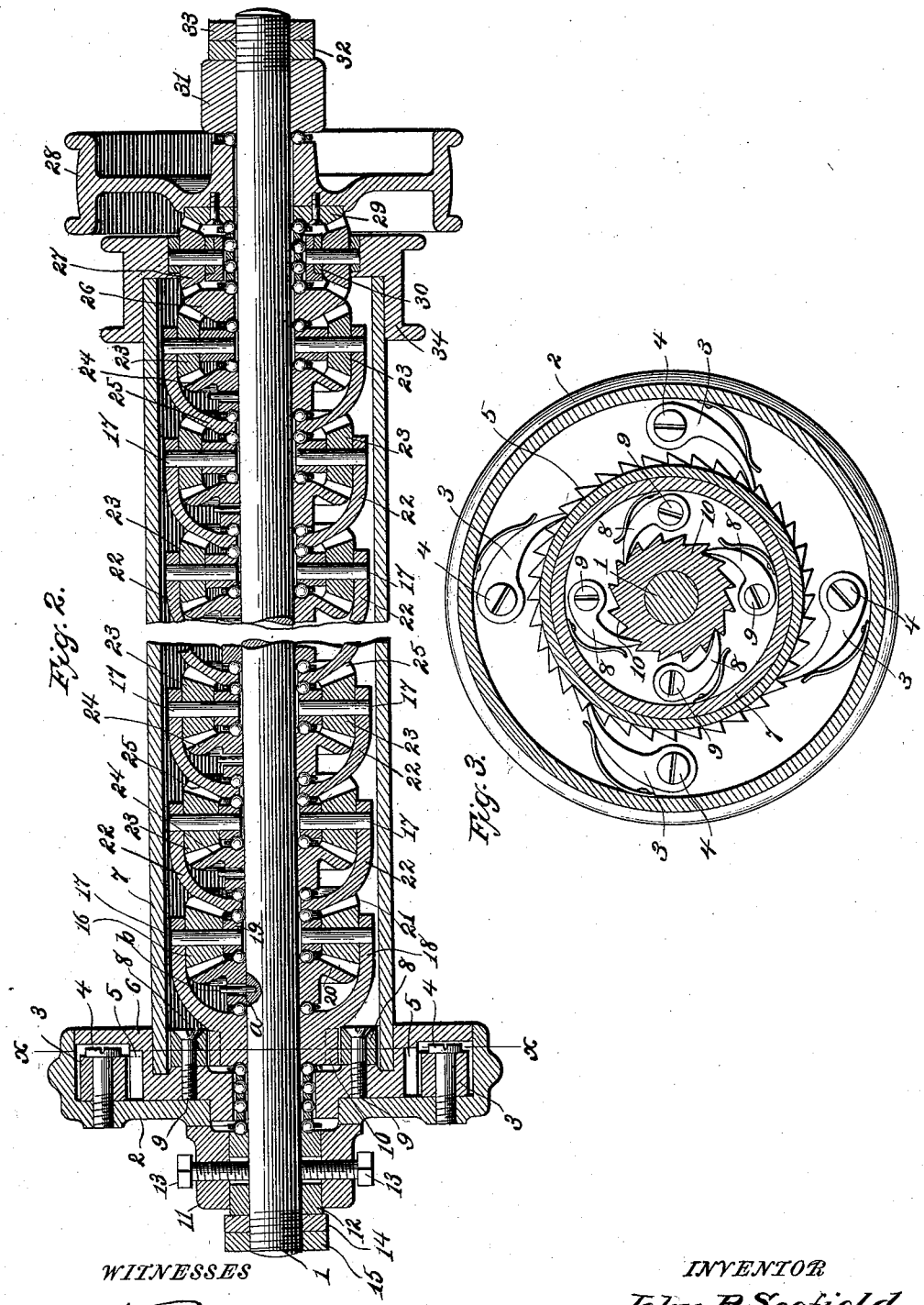
WITNESSES
E. C. Wurdeman
Victor J. Evans
INVENTOR
John R. Scofield
By John Wedderburn
Attorney

UNITED STATES PATENT OFFICE.

JOHN R. SCOFIELD, OF DALLAS, TEXAS, ASSIGNOR OF FOUR-FIFTHS TO GEORGE D. HUNT, JAS. W. HUNT, J. P. DEGENHART, AND OSCAR HUNT, OF SAME PLACE.

SPEED-GEARING.

SPECIFICATION forming part of Letters Patent No. 599,870, dated March 1, 1898.

Application filed June 10, 1897. Serial No. 640,234. (No model.)

*To all whom it may concern:*

Be it known that I, JOHN R. SCOFIELD, of Dallas, in the county of Dallas and State of Texas, have invented certain new and useful Improvements in Speed-Gearings; and I do hereby declare the following to be a full, clear, and exact description of the invention, such as will enable others skilled in the art to which it appertains to make and use the same.

The object of this invention is to provide an improved gearing mechanism in which the speed or rotation of a drum or wheel is greatly increased through the intervention of gearing-wheels mounted upon a single shaft, the rotations of the drum or wheel being transmitted to pinions which mesh with a gear-wheel rigidly connected to the shaft and with a gear-wheel loosely mounted thereon, the latter having arms carrying pinions meshing with a second series of rigid and loose gear-wheels, and so on until the desired rate of speed with relation to the driven wheel or drum is attained.

The invention further contemplates a construction and arrangement by which the speed-gearing is applied in connection with a weight-motor, and to this end the drum is connected to the train of gearing through the interposition of pawl-and-ratchet mechanism, which provides for the rope or flexible connection to which the weight is attached being rewound, provision being also made for a band-wheel or friction-brake to regulate the speed.

To these ends and to such others as the invention may pertain the same consists in a speed-gear or train of gearing mounted upon a single shaft and comprising a driven wheel or drum having arms carrying pinions in mesh with rigid and loose gear-wheels mounted upon the shaft, the loose gear-wheel having arms carrying a second set of pinions in mesh with a second series of rigid and loose gear-wheels.

The invention further consists in the particular application of the speed-gear, as described in the following specification, in which reference is made to the accompanying drawings, and to letters and numerals thereon, which designate the different parts.

In the drawings forming part of this specification, Figure 1 is an elevation showing the application of my invention in connection with a weight-motor, a part of the drum being broken away to show the gearing. Fig. 2 is a longitudinal sectional view through the drum and the gearing driven thereby. Fig. 3 is a transverse sectional view on the line X X of Fig. 1.

Referring to the drawings by letters and numerals, 1 designates the supporting-shaft, upon which the train of gearing is mounted and inclosed within a drum, as shown in the accompanying drawings. Near one end of this shaft is mounted a sectional or hollow wheel or casing 2, inclosing pawls 3, mounted upon machine-screws 4, which are let into one side of the casing, the said pawls engaging the ratchet-teeth 5, formed integral with the other side or section of the casing, the latter having an independent movement. The section 6 of the hollow wheel or casing is rigidly secured to the drum 7 and carries a set of pawls 8, mounted upon machine-screws 9, the said pawl engaging a ratchet-wheel 10, loosely mounted upon the shaft. Ordinary ball-bearings are interposed between the casing or hollow wheel and shaft and also between the wheel 10 and shaft, being held in place by the ordinary bearing-rings, and the casing is held in place by a collar 11, which is rigidly secured to the shaft, and is provided with a sliding hub or sleeve 12, having slots through which the set-screws 13 pass that hold the said collar in engagement with the shaft. Against the sliding collar bear the set-nuts 14 and 15, which engage the threaded end of the shaft 1, and by the construction and arrangement just described it will be noted that the turning of the drum in one direction will impart a rotary motion to the collar or ratchet-wheel 10, while an opposite rotation will cause the pawls 8 to escape over the ratchet-wheel 10 while the casing is revolved through the intervention of the pawls 3. Consequently a turning of the casing in one direction will give a corresponding movement to the drum and said movement will not be transmitted to the ratchet-wheel 10.

The manner of connecting the rigid or stationary gear-wheels of the train to the shaft consists in providing the hubs of said gear-wheels with slots a, through which the retaining-pins b pass, this arrangement being used in connection with the movable sleeve 12 to take up wear of the parts.

As the invention is shown applied in connection with a weight-motor, power is exerted upon the drum by the rope which is wound thereon and carries the weight, and this power, being transmitted to the ratchet-wheel 10, as hereinbefore described, is converted into a high rate of speed given to a pulley or wheel through the intervention of a train of gearing inclosed within the drum. This gearing consists of pinions 16 16, journaled upon shafts 17, carried by arms 18, extending from the ratchet-wheel 10, the inner ends of the shafts bearing in a hub 19, mounted upon the shaft 1, said pinions meshing with a gear-wheel 20, rigidly connected to the shaft 1, and with a gear-wheel 21, loosely mounted upon said shaft. A rotation of the ratchet-wheel 10 will give a more rapid rotation to the gear-wheel 21, for the pinions are carried around by the ratchet-wheel and also mesh with the stationary gear-wheel 20, thus increasing the speed of the gear-wheel 21 twofold. Now by providing the gear-wheel 21 with the projecting arms 22 and the said arms with the pinions 23, in mesh with the rigid gear-wheel 24 and loose gear-wheel 25, the rotation of the latter will be further increased in proportion. This manner of gearing is repeated to a point where the rotations of the loose gear-wheel 26 are carried through the head of the drum by pinions 27 and drives a pulley 28, the latter having a tooth-ring 29, which meshes with the aforesaid pinions. The pinions are mounted upon a hub 30, mounted upon the shaft and provided with the usual ball-bearings, while the pulley or wheel 28 also has a ball-bearing, the outer bearing-ring 31 being held in place by the set-nuts 32 and 33. The head of the drum adjoining the pulley or wheel 28 is provided with a band-wheel 34, around which passes a band forming a frictional brake to regulate or govern the speed of the device.

From the foregoing description, in connection with the accompanying drawings, it will be seen that I provide a speed-gear in which the rotation of a certain part is converted by a train of gearing into a very rapid rate of speed, that can be employed in connection with light machinery, such as operating fly-fans, in which the motive power can be derived from a weight, as hereinbefore described, or from a motor which may be geared directly to the collar or ratchet-wheel 10. It will also be observed that the rate of speed can be reversed or reduced from a high to a low speed by changing the application of the power from one end to the other. It is also apparent that the same system of gearing could be carried out in increasing the speed beyond each side of a centrally-mounted wheel or drum.

A gearing of this character may be effectively used in connection with bicycles or motor vehicles, in which the power could be greatly increased in transmitting it to the driving-wheel of the vehicle. I also anticipate using more than two pinions between each set of rigid and loose gear-wheels, in which case a corresponding number of arms would be added to the loose wheels and, as hereinbefore mentioned, the power could be applied directly to the wheel which carries the first set of arms instead of through the intervention of the drum and pawl-and-ratchet mechanism. It is therefore obvious that numerous modifications or changes could be made in the construction and arrangement of the parts hereinbefore described without affecting or sacrificing any of the advantages of my invention, and I therefore reserve the right to make such modifications and changes as are within the spirit and scope of my claims.

Having thus described my invention, what I claim, and desire to secure by Letters Patent, is—

1. In a speed-gearing, the combination of a shaft, a casing rigidly secured to the drum, pawls mounted upon the casing, a ratchet-wheel loosely mounted on the shaft and adapted to be driven by said drum and pawls, arms projecting from said ratchet-wheel, bevel-pinions carried by said arms, a bevel-wheel fast to the shaft and a second bevel-wheel loose on the shaft, said bevel-wheel meshing with said bevel-pinions, arms projecting from said loose bevel-wheel, a second set of bevel-pinions carried by said arms, fast and loose bevel-wheels meshing with said pinions, a pulley loose on the shaft, connections between the last loose bevel-gear and said pulley, and a band-wheel on said drum, substantially as described.

2. In a speed-gearing, the combination of a shaft, a drum loose thereon, a casing connected thereto and made up of two sections, a pawl-and-ratchet mechanism connecting said sections, a ratchet-wheel loosely mounted on said shaft, a pawl carried by the casing and engaging said ratchet-wheel, arms extending from the ratchet-wheel, pinions carried by said arms, a rigid and a loose gear-wheel on the shaft in mesh with said pinions, a second set of pinions carried by the loose gear-wheel and a second rigid gear-wheel on the shaft in mesh with said second set of pinions, and so on, pinions mounted in the head of the drum meshing with the last loose gear-wheel of the train, a pulley loose on the shaft beyond the drum, a toothed ring on the pulley meshing with the said last-mentioned pinions, the said drum inclosing the train of gearing, and a brake on the said drum, substantially as described.

In testimony whereof I have signed this specification in the presence of two subscribing witnesses.

JOHN R. SCOFIELD.

Witnesses:
J. W. HUNT,
J. P. DEGENHART.